(12) United States Patent
Ohtsubo et al.

(10) Patent No.: US 8,820,810 B2
(45) Date of Patent: Sep. 2, 2014

(54) STEERING COLUMN COVER STRUCTURE OF AUTOMOTIVE VEHICLE

(71) Applicant: Mazda Motor Corporation, Hiroshima (JP)

(72) Inventors: Tomonori Ohtsubo, Hiroshima (JP); Hiroshi Kushida, Higashihiroshima (JP); Masaki Takemura, Higashihiroshima (JP); Tomoshi Mitsunari, Hiroshima (JP); Matsuhiro Tanaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 74 days.

(21) Appl. No.: 13/648,071

(22) Filed: Oct. 9, 2012

(65) Prior Publication Data

US 2013/0087006 A1 Apr. 11, 2013

(30) Foreign Application Priority Data

Oct. 11, 2011 (JP) .................................. 2011-223624

(51) Int. Cl.
| | |
|---|---|
| *B60R 21/20* | (2011.01) |
| *G05G 1/30* | (2008.04) |
| *B60R 21/05* | (2006.01) |
| *B60R 13/02* | (2006.01) |
| *B60K 26/02* | (2006.01) |

(52) U.S. Cl.
CPC *B60R 21/05* (2013.01); *G05G 1/30* (2013.01); *B60R 13/02* (2013.01); *B60K 26/02* (2013.01)
USPC .............................. 296/1.08; 296/70; 74/492

(58) Field of Classification Search
USPC ........ 296/1.08, 70; 74/492; 180/90; 280/731, 280/752
See application file for complete search history.

(56) References Cited

U.S. PATENT DOCUMENTS 5,067,747 A * 11/1991 Yokoyama ..................... 280/777

FOREIGN PATENT DOCUMENTS

| JP | 2005-075339 A | 3/2005 |
|---|---|---|
| JP | 2008-120106 A | 5/2008 |

* cited by examiner

*Primary Examiner* — Joseph Pape
(74) *Attorney, Agent, or Firm* — Studebaker & Brackett PC

(57) ABSTRACT

An acceleration pedal is arranged on one side, in a vehicle width direction, of a steering column cover covering a steering column so as to move forward or slant forward through a press operation of a press face thereof. A guide face is provided at a specified portion of a lower face of the steering column cover which is positioned in front of a lower-face rear end portion in a steering-shaft axis direction and on an acceleration-pedal-arrangement side, wherein the guide face is configured to project downward below an extension line extending from the lower-face rear end portion in the steering-shaft axis direction and extend forward. Accordingly, a passenger's foot can be properly restrained from moving, in the vehicle width direction, off the pedal in a vehicle head-on collision, ensuring an appropriate ingress-and-egress performance of a passenger.

14 Claims, 9 Drawing Sheets

STEERING COLUMN COVER STRUCTURE OF AUTOMOTIVE VEHICLE

BACKGROUND OF THE INVENTION

The present invention relates to a steering column cover structure of an automotive vehicle equipped with a steering column covering a steering column An acceleration pedal of a pedal device of an automotive vehicle is, differently from a clutch pedal or a brake pedal which are operated with a relatively large press force, required to be operated with a relatively small press force so as to provide a desirable vehicle speed, keeping a press angle of the pedal (press face) properly. Accordingly, there have been problems described below in a vehicle head-on collision.

Specifically, as shown in FIG. 9, when a vehicle V collides against an obstacle α in a vehicle collision, such as an oblique or offset collision, a vehicle body tends to move rotating around the obstacle α as illustrated with a two-dotted broken line in this figure, and a passenger M in a vehicle compartment tends to move in a traveling direction of the vehicle V (prior to the vehicle collision) due to the inertia. In this case, since the passenger M tends to move obliquely relative to the vehicle body, there is a concern that a foot Mf of the passenger M pressing an acceleration pedal 104 with a relatively small press force may slip off a press face of the acceleration pedal 104 due to the collision acceleration in the vehicle head-on collision.

If the foot Mf slips off the acceleration pedal 104 described above, there may occur some problems in that the foot Mf moves to an inappropriate position for the best impact absorption or a position of the foot Mf becomes abnormal so that some load is applied to the foot Mf improperly.

Meanwhile, a so-called organ type of pedal which moves forward substantially horizontally or slants through a press operation of a press face thereof is known as a pedal device of an automotive vehicle. This organ type of pedal, a press face of which moves obliquely forward and downward through the press operation by a passenger, has a feature that a press point on the press face may not change improperly without moving a heel of the passenger. Accordingly, the organ type of pedal has an advantage that the press face of the pedal can be more easily adjusted and held by using the heel as a standard, compared to a so-called hanging type of pedal, a press face of which moves obliquely forward and upward through its press operation and which slants in a perpendicular direction to a floor face.

This organ type of pedal, however, has problems similar to those of the acceleration pedal 104 described above for the following reasons.

Specifically, the organ type of pedal, which is different from the hanging type of pedal, has a feature that the position of its press face approaches the horizontal position as its press operation progresses, so that it becomes difficult to keep the foot properly. Therefore, as shown in FIG. 9, when the vehicle V collides against the obstacle α in the head-on collision, the foot pressing the organ type of pedal may improperly slip off the press face and move relatively in the vehicle width direction, which is similar to the case of the acceleration pedal 104.

Meanwhile, a structure in which an impact applied to a knee or chest of the passenger in the vehicle head-on collision can be absorbed by a steering column which covers a steering column is known (see Japanese Patent Laid-Open publication No. 2005-75339).

Further, a structure in which an oblique move of a passenger relative to a vehicle body in the vehicle oblique collision can be restrained by a knee airbag which inflates toward the passenger's knee is known (see Japanese Patent Laid-Open publication No. 2008-120106).

Herein, the above-described patent documents refer to nothing about a problem in that the passenger's foot pressing the pedal slips off the press face of the pedal and move in the vehicle head-on collision, so that this problem of the foot's moving may not be restrained surely by the prior art disclosed in these patent documents.

SUMMARY OF THE INVENTION

An object of the present invention is to provide a steering column cover structure of an automotive vehicle which can properly restrain the foot from moving, in the vehicle width direction, off the pedal in the vehicle head-on collision, ensuring an appropriate ingress-and-egress performance of the passenger.

According to the present invention, there is provided a steering column cover structure of an automotive vehicle equipped with a pedal which is arranged on one side, in a vehicle width direction, of a steering column cover covering a steering column so as to move forward or slant forward through a press operation of a press face thereof, wherein a guide face is provided at a specified portion of a lower face of the steering column cover which is positioned in front of a lower-face rear end portion in a steering-shaft axis direction and on a pedal-arrangement side, the guide face being configured to project downward below an extension line extending from the lower-face rear end portion of the steering column cover in the steering-shaft axis direction and extend forward. Herein, the pedal may be an acceleration pedal to operate a drive force of the vehicle. Further, the pedal may be preferably configured to move forward substantially horizontally or slant forward.

According to the present invention, a passenger's leg portion located on the side of the pedal, the foot of which tends to slip off the press face of the pedal in the vehicle head-on collision, can be restrained by the guide face from moving relatively, in the vehicle width direction, off the pedal, so that the foot of this leg can be properly restrained from moving, in the vehicle width direction, off the pedal. Further, since the lower-face rear end portion of the steering column cover is located above the level of the guide face, even when the passenger egresses from the vehicle in a state in which the passenger's knee is located at a relatively high position (in a vehicle egress mode), any interference of the knee with the steering column cover can be avoided, so that the appropriate ingress-and-egress performance of the passenger can be ensured.

According to an embodiment of the present invention, the pedal is configured to move forward substantially horizontally or slant forward.

According to another embodiment of the present invention, the guide face is configured to extend obliquely upward and toward the pedal-arrangement side from a specified position which is located in front of a rear end portion of the steering column cover and the lower-face rear end portion of the steering column cover to a specified side portion of the steering column cover which is positioned on the pedal-arrangement side. Thereby, since the leg portion can be guided in an earlier stage at a position located rearward from the portion projecting downward below the above-described extension line, it can be more smoothly restrained that the leg portion moves relatively, in the vehicle width direction, off the pedal.

According to another embodiment of the present invention, the guide face is located at a more inside position of the steering column cover, compared to a side face of the steering column cover which is opposite to another side face of the steering column cover positioned on the pedal-arrangement side in the vehicle width direction. Thereby, a scope of guiding the leg portion located on the side of the pedal in the vehicle width direction can be enlarged. Accordingly, even if the passenger's knee moves in the vehicle width direction in the vehicle head-on collision, the leg portion can be guided stably. Further, since only the side face of the steering column cover positioned on the pedal-arrangement side is located at a more inside position of the steering column cover, a space for storing some components can be provided inside the steering column cover located on the opposite side to the pedal-arrangement side.

According to another embodiment of the present invention, the guide face is located at a more downward position, compared to a side face of the steering column cover which is opposite to another side face of the steering column cover positioned on the pedal-arrangement side in the vehicle width direction. Thereby, the steering column cover located on the opposite side to the pedal-arrangement side can be configured not to project downward. Accordingly, a moving space for the knee in the passenger's ingress-and-egress can be provided, so that any interference of the knee with the steering column cover can be avoided surely.

According to another embodiment of the present invention, a steering-position adjusting lever is provided at a specified portion of the lower face of the steering column cover which is positioned on an opposite side to the pedal-arrangement side in the vehicle width direction. Thereby, it can be restrained that a space around the leg portion when the passenger is seated becomes improperly narrow because of existence of the steering-position adjusting lever.

According to another embodiment of the present invention, the acceleration pedal is a pedal having a swinging center which is positioned at or below a level of a center of the press face of the pedal. Thereby, the leg portion located on the side of the acceleration pedal, the foot of which tends to slip off the press face of the pedal, can be restrained by the guide face from moving relatively, in the vehicle width direction, off the acceleration pedal, so that the foot can be restrained from moving, in the vehicle width direction, off the acceleration pedal.

According to another aspect of the present invention, there is provided a steering column cover structure of an automotive vehicle, comprising a guide face which is provided at a specified portion of a lower face of a steering column cover covering a steering column which is positioned in front of a lower-face rear end portion in a steering-shaft axis direction and on an acceleration-pedal-arrangement side, wherein the guide face is configured to project downward below an extension line extending from the lower-face rear end portion of the steering column cover in the steering-shaft axis direction and extend forward, and to extend obliquely upward and toward the acceleration-pedal-arrangement side from a specified position which is located in front of a rear end portion of the steering column cover and the lower-face rear end portion of the steering column cover to a specified side portion of the steering column cover which is positioned on the acceleration-pedal-arrangement side, the guide face is located at a more downward position, compared to a side face of the steering column cover which is opposite to another side face of the steering column cover positioned on the acceleration pedal-arrangement side in the vehicle width direction, and a steering-position adjusting lever is provided at a specified portion of the lower face of the steering column cover which is positioned on an opposite side to the acceleration-pedal-arrangement side in the vehicle width direction. According to this aspect of the present invention, since the steering-position adjusting lever is provided on the opposite side to the guide face (the acceleration-pedal arrangement side) in the vehicle width direction, the layout of both the steering-position adjusting lever and the guide face can be provided properly.

According to further another aspect of the present invention, there is provided a steering column cover structure of an automotive vehicle equipped with a pedal which is arranged on one side, in a vehicle width direction, of a steering column cover covering a steering column so as to move forward or slant forward through a press operation of a press face thereof, wherein a guide face is provided at a specified portion of a lower face of the steering column cover which is positioned in front of a lower-face rear end portion in a steering-shaft axis direction and on a pedal-arrangement side, the guide face being configured to project downward below an extension line extending from the lower-face rear end portion of the steering column cover in the steering-shaft axis direction and extend forward, and to extend obliquely upward and toward the pedal-arrangement side from a specified position which is located in front of a rear end portion of the steering column cover and the lower-face rear end portion of the steering column cover to a specified side portion of the steering column cover which is positioned on the pedal-arrangement side, the guide face is located at a more downward position, compared to a side face of the steering column cover which is opposite to another side face of the steering column cover positioned on the pedal-arrangement side in the vehicle width direction, and a steering-position adjusting lever is provided at a specified portion of the lower face of the steering column cover which is positioned on an opposite side to the pedal-arrangement side in the vehicle width direction. According to this aspect of the present invention, since the steering-position adjusting lever is provided on the opposite side to the guide face (the pedal-arrangement side) in the vehicle width direction, the layout of both the steering-position adjusting lever and the guide face can be provided properly, similarly to the above-described aspect of the present invention.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
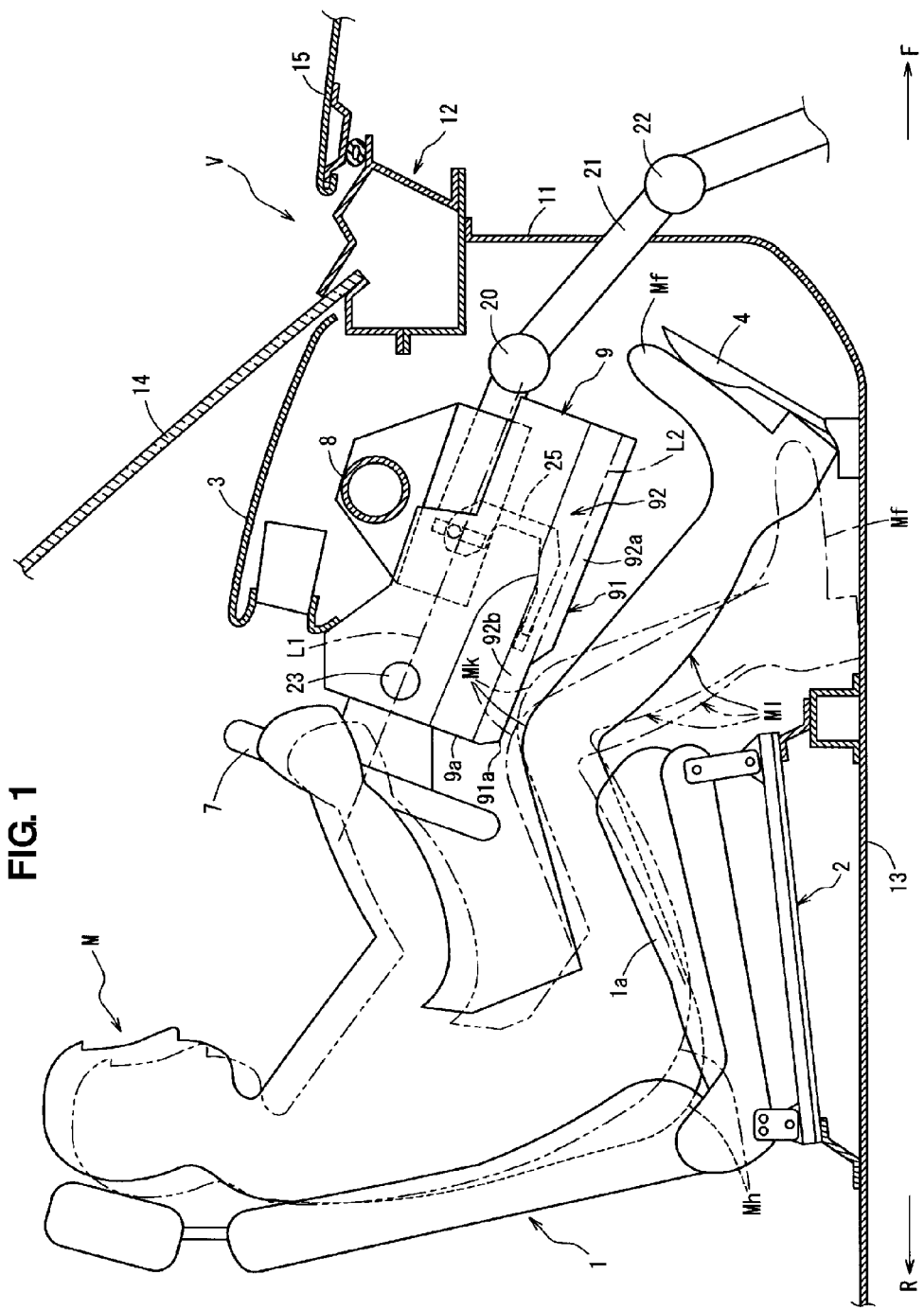
FIG. 1 is a side view showing a vehicle front portion equipped with a steering column cover structure according to an embodiment of the present invention.
Figure 2:
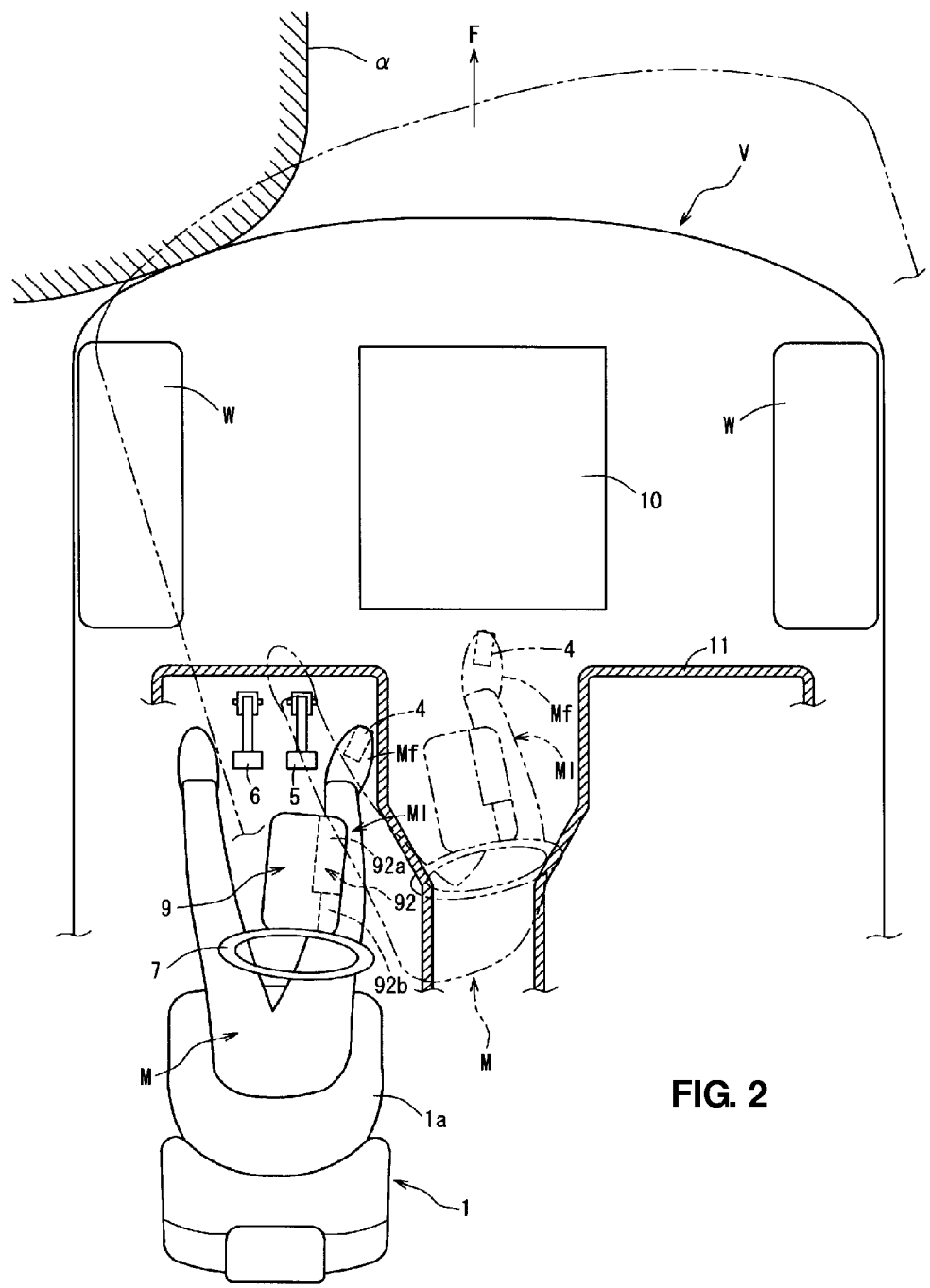
FIG. 2 is a plan view of FIG. 1.

FIG. 1 is a side view showing a vehicle front portion equipped with a steering column cover structure according to an embodiment of the present invention, and FIG. 2 is a plan view of FIG. 1. In an automotive vehicle V shown in FIGS. 1 and 2, a driver's seat 1 is arranged on the left side in a vehicle compartment, and a longitudinal-position adjusting mechanism 2 to adjust a longitudinal position of a seat cushion 1a of the seat 1 by making it slide is provided. This adjusting mechanism 2 is provided to slant obliquely forward and upward. In the figures, an arrow F shows a vehicle forward direction and an arrow R shows a vehicle rearward direction.

Further, a resin-made instrument panel 3 which extends in a vehicle width direction is arranged on a front-left side in the vehicle compartment, and below this instrument panel 3 are arranged an acceleration pedal 4, a brake pedal 5 (see FIG. 2) and a clutch pedal 6 (see FIG. 2), which are operated by a passenger M seated in the driver's seat 1 through pressing them. Moreover, a steering wheel 7 and a steering column cover (hereinafter, referred to as "column cover") 9 which is supported at an instrument panel member 8 are arranged at a specified position of the instrument panel 3 which faces to the driver's seat 1.

At an vehicle body of the automotive vehicle V are further provided a dash panel 11 which partitions a storage space where a power train 10 (see FIG. 2) including an engine or motor and a transmission are stored from the above-described vehicle compartment, a cowl portion 12 which extends in the vehicle width direction above the dash panel 11, and a substantially flat floor panel 13 which forms a floor face of the vehicle compartment. Herein, a member 14 shown in FIG. 1 is a windshield which is supported by the cowl portion 12 at its lower end portion, and a member 15 is a bonnet (an engine hood) which covers over the above-described storage space.

Figure 3:
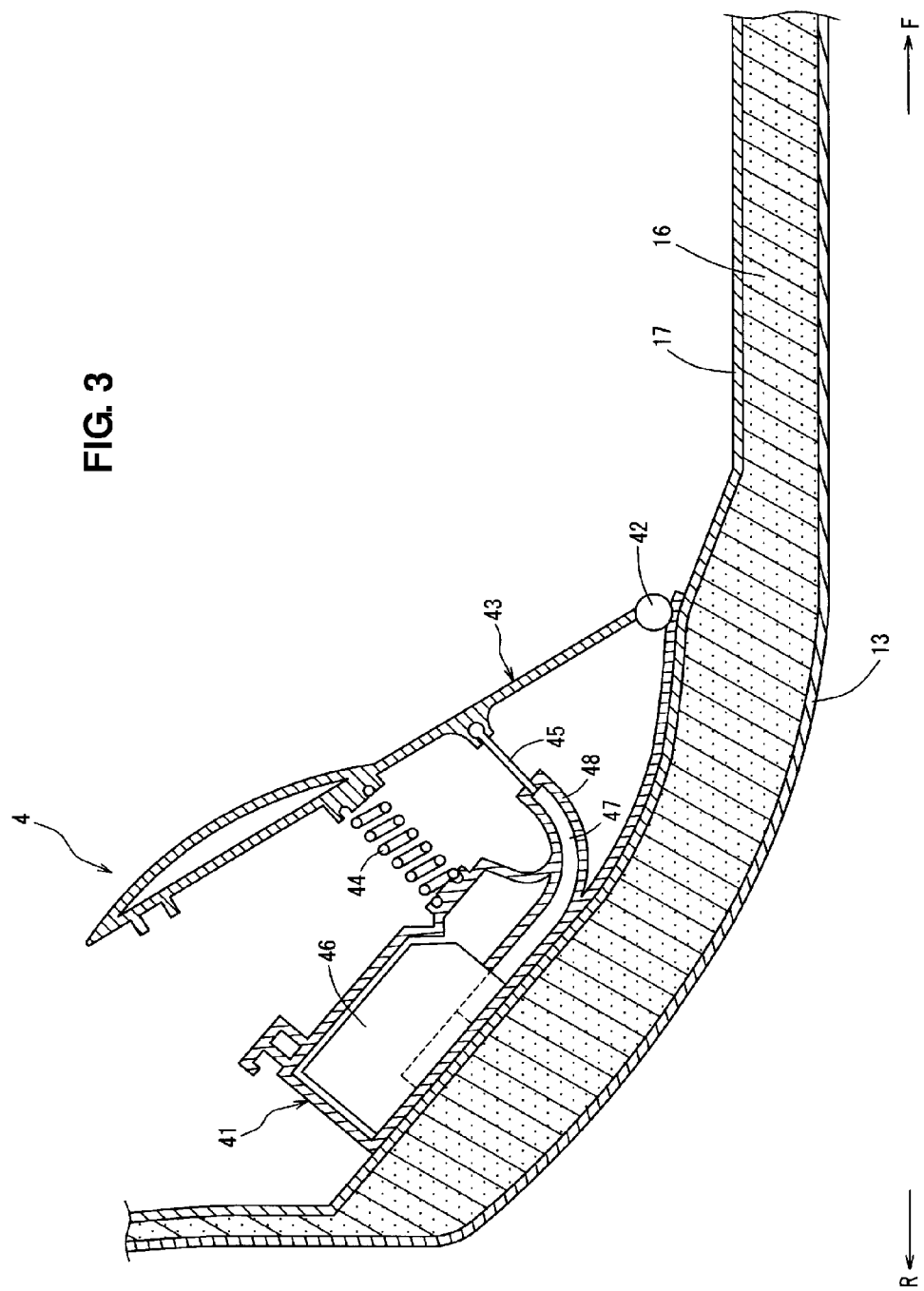
FIG. 3 is a side view showing a structure of an acceleration pedal.

FIG. 3 is a side view showing a structure of the acceleration pedal. On an upper face of the above-described floor panel 13 are arranged an insulator 16 which is primarily made of a melt sheet, a felt material, glass wool, or the like having functions of vibration proof, sound insulation, heat insulation and the like, and a floor mat 17 which is well known as a member covering an upper face of the insulator 16.

In the automotive vehicle V, the brake pedal 5 and the clutch pedal 6 are comprised of a hanging type of pedal, respectively, and the acceleration pedal 4 is comprised of a so-called organ type of pedal, which comprises a base member 41 which is fixed on the side of floor panel 13, a press-face board 43 which is supported at the base member 41 and swings around a lower-end hinge portion 42 according to a press operation of the passenger, and a biasing member 44 which is comprised of a compressive spring or the like to bias the press-face board 43 rearward, wherein the above-described lower-end hinge portion 42 is located below a press face of the press-face board 43.

The press-face board 43 is pivotally supported around the lower-end hinge portion 42, and in a normal state (non-operational state), the press-face board 43 is held in a slant state in which the press-face board 43 has a specified angle relative to the horizontal line according to a biasing force of the biasing member 44.

The acceleration pedal 4 is equipped with an acceleration-pedal operation detection portion which detects a swing displacement of the press-face board 43 and outputs a detection signal to a control portion, not illustrated. An operational rod 45 which constitutes the acceleration-pedal operation detection portion is pivotally supported at a back face of the press-face board 43.

A control box 46 and a guide member 48 are provided at the base member 41. The control box 46 includes a liner sensor to constitute the above-described acceleration-pedal operation detection portion. The guide portion 48 supports a connecting member 47 which is comprised of a flexible linear body or the like and connected to a lower end portion of the operational rod 45.

When the passenger M, as a driver, presses the press-face board 43 in a state in which the foot Mf of the passenger M who places the heel portion on the floor panel 13 contacts the press face of the press-face board 43 of the acceleration pedal 4, the press-face board 43 swings forward around the lower-end hinge portion 42 against the biasing force of the biasing member 44, so that the press-face board 43 slants forward. The press force inputted to the press-face board 43 is transmitted to the liner sensor of the control box 46 via the operational rod 45 and the connecting member 47. Thereby, the amount of operation of the press-face board 43 is detected. This detection signal is outputted from the control box 46 to a power-train control unit via a harness, not illustrated.

Figure 4:
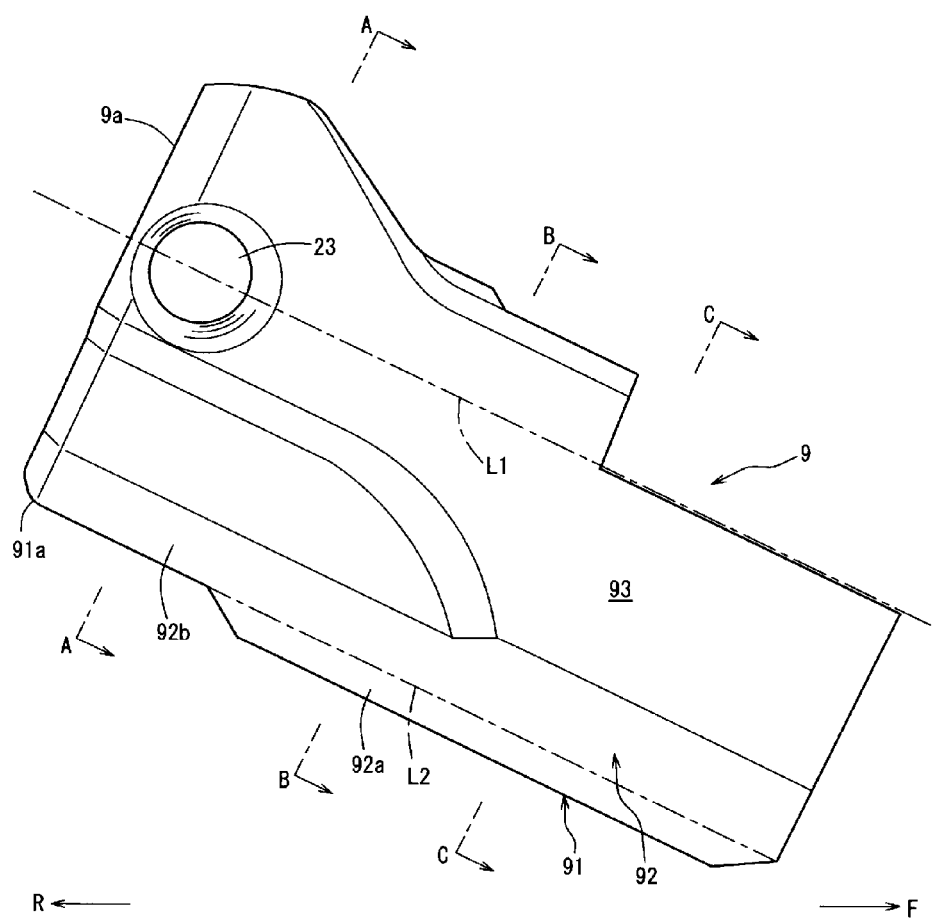
FIG. 4 is a side view showing a structure of a steering column cover.
Figure 5:
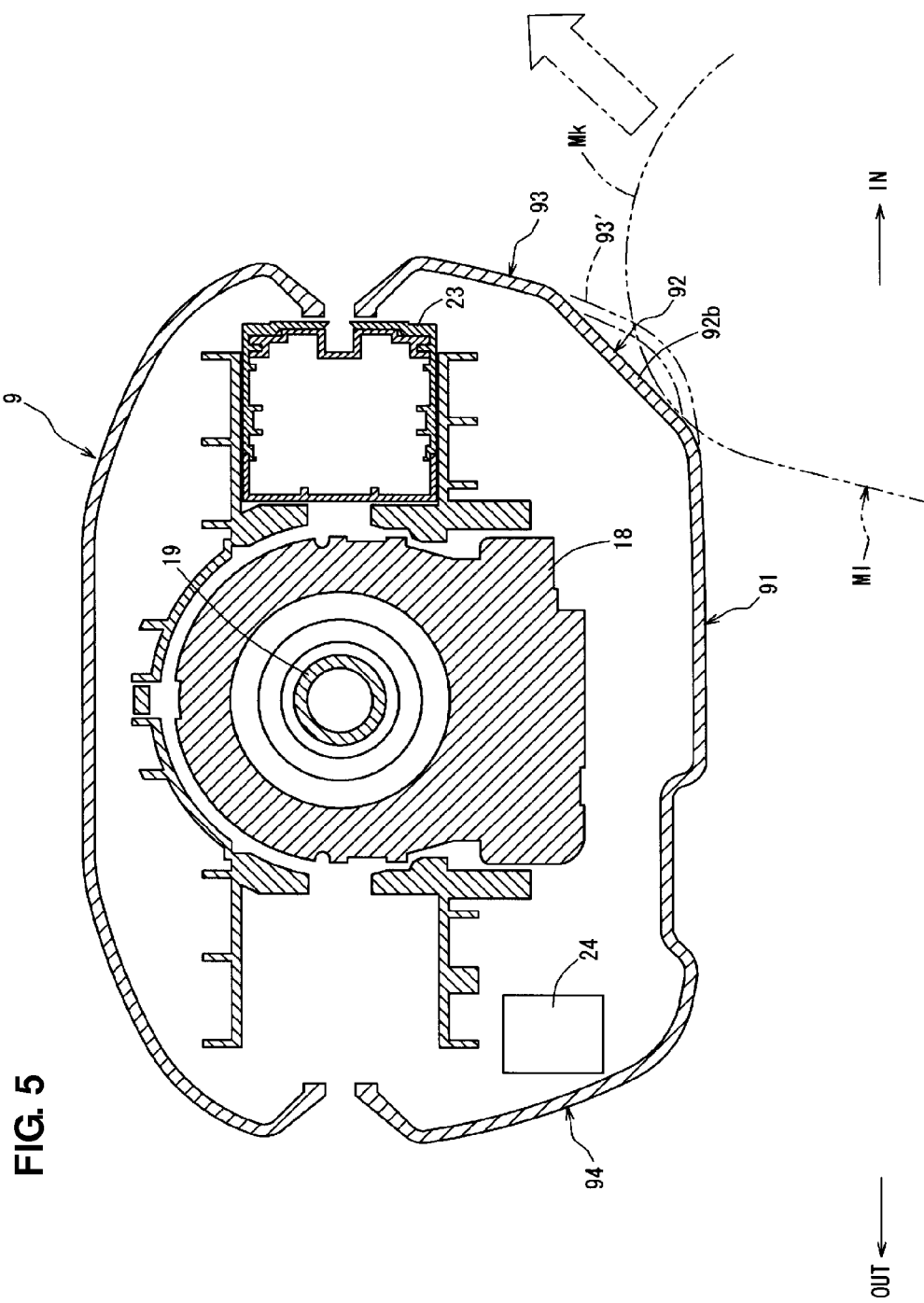
FIG. 5 is a sectional view taken along line A-A of FIG. 4.
Figure 6:
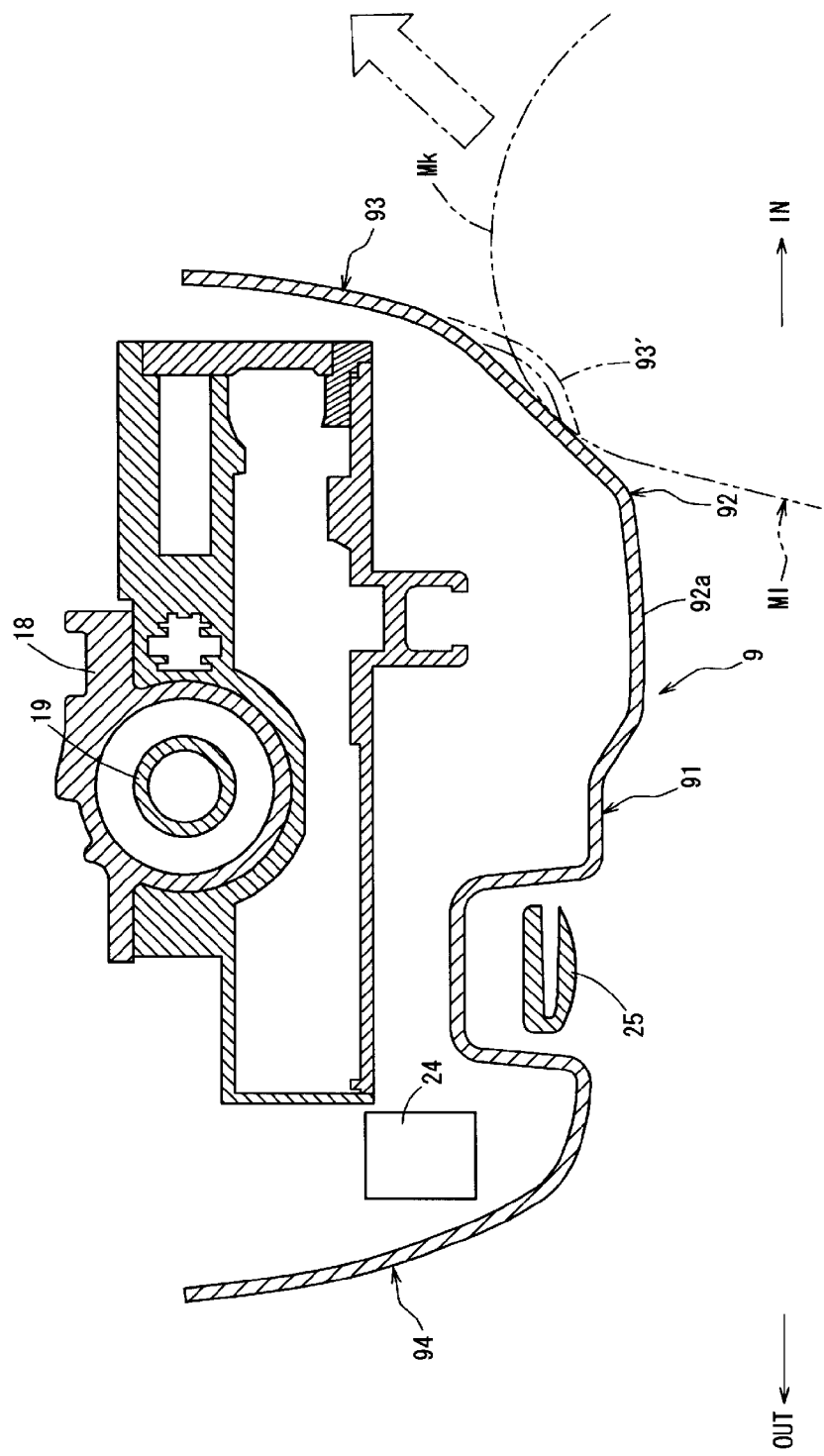
FIG. 6 is a sectional view taken along line B-B of FIG. 5.
Figure 7:
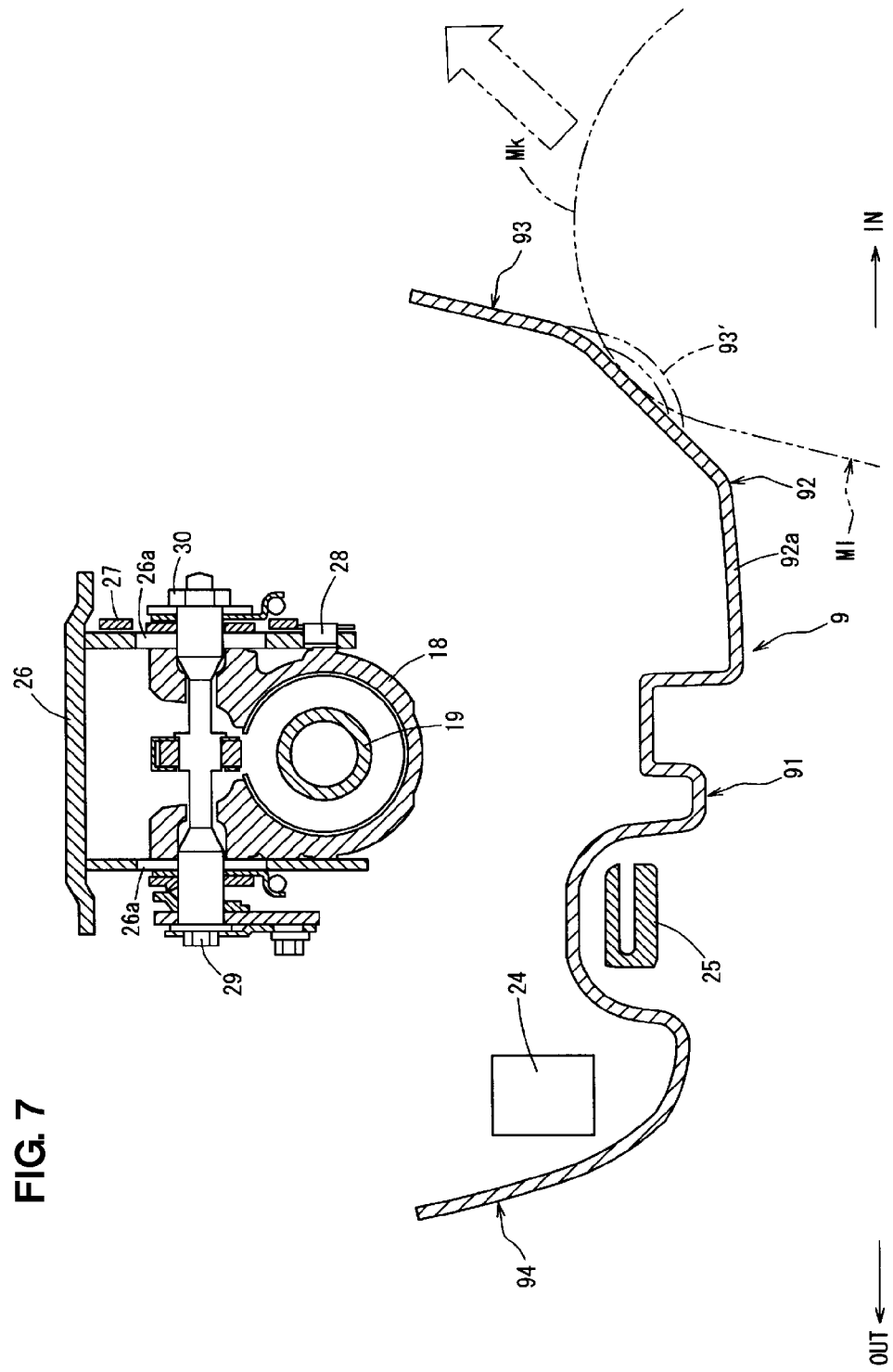
FIG. 7 is a sectional view taken along line C-C of FIG. 6.

FIG. 4 is a side view showing a structure of a column cover, and FIGS. 5-7 are sectional views taken along lines A-A, B-B, and C-C of FIG. 4, respectively. In the figures, an arrow IN shows a vehicle inward direction, and an arrow OUT shows a vehicle outward direction. In the present embodiment, the column cover 9 shown in FIGS. 1, 2 and 4-7 covers a steering column 18 shown in FIGS. 5-7, and a steering shaft 19 (see FIGS. 5-7) which transmits a steering force of the steering wheel 9 to a vehicle wheel W (see FIG. 2) is rotatably supported at the steering column 18. A rotational force of the steering shaft 19 is transmitted to a steering gear box, not illustrated, via an upper universal joint 20, a second shaft 21, a lower universal joint 22 and the like.

As shown in FIGS. 5-7, a key cylinder 23, a steering-angle sensor 24, and other various components, such as an electric power-steering unit, or variable steering-gear-ratio device (VGR) are stored in the column cover 9.

Further, as shown in FIGS. 1, 2 and 4-7, the column cover 9 includes a guide face 92 which has a downward extension portion 92a, which is provided at a specified portion of a lower face 91 of the column cover 9 which is positioned in front of a lower-face rear end portion 91a in an axial direction L1 of the steering shaft 19 and on the side of the acceleration pedal 4, wherein the downward extension portion 92a projects downward below an extension line L2 extending from the lower-face rear end portion 91a in the axial direction L1.

The guide face 92 has, as shown in FIGS. 1, 2, 4 and 5, an upward extension portion 92b, which extend obliquely upward and toward the right side from a specified position which is located in front of the rear end portion 9a of the column cover 9 in the axial direction L1 and the lower-face rear end portion 91a of the column cover 9 to a specified side portion of the column cover 9 which is positioned on the side of the acceleration pedal 4 (i.e., on the pedal-arrangement side)

Further, the guide face 92 is, as shown in FIGS. 5-7, located at a more inside position of the column cover 9, compared to a side face 94 of the column cover 9 which is opposite to a side face 93 of the column cover 9 positioned on the side of the acceleration pedal 4 in the vehicle width direction. Some components, such as the above-described steering-angle sensor 24, are arranged in an inside space of the column cover 9 located on the side of the side face 94. FIGS. 5-7 show a shape of a side face 93' with a two-dotted broken line in a case in which the side face 93' is configured to be symmetrical to the side face 94.

Further, the downward extension portion 92a of the guide face 92 is, as shown in FIGS. 6 and 7, located at a more downward position, compared to the side face 94 of the column cover 9.

Moreover, a tilt lever 25 to adjust the position of the steering shaft 19 (the steering wheel 7) is provided at a specified portion of the lower face 91 of the column cover 9 which is positioned on an opposite side to the side of the acceleration pedal 4 (i.e., to the acceleration-pedal arrangement side)

A bracket 26 having a U-shaped cross section is arranged inside the column cover 9 as shown in FIG. 7, which forms a pair of right-and-left groves for tilt 26a. A plate for fastening 27 and a plate-support pin 28 are provided at one side of the bracket 26. A bolt 29 passes through the grooves 26a, and the bracket 26 and the plate for fastening 27 are fastened by the bolt 29 and a nut 30. The bolt 29 passing through the grooves 26a is arranged to be movable relative to the grooves 26a when the tilt lever 25 is operated.

Accordingly, when the fastening of the plate for fastening 27 is released by unfastening the bolt 29 and the nut 30 and then the steering column 18 is tilted, the bolt 29 slides along the grooves 26a, whereby the steering shaft 19 can be tilted.

Next, a case in which the automotive vehicle V collides against an obstacle α, so that a vehicle oblique or offset collision occurs as shown in FIG. 2 in particular will be described. In this case, the passenger M tends to move obliquely forward relative to the vehicle body, so that a leg portion Ml including the foot Mf tends to move toward the left side in the vehicle width direction.

In the present embodiment, the leg portion Ml (knee Mk) of the passenger M contacts the guide face 92 of the column cover 9, specifically the leg portion Ml contacts the upward extension portion 92b located in front of the lower-face rear end portion 91a first, as shown by the two-dotted broken line in FIG. 5. Then, the leg portion Ml is guided onto the downward extension portion 92a by the upward extension portion 92b. As the move of the passenger M progresses, the leg portion Ml is guided by the downward extension portion 92a as shown in FIGS. 6 and 7, so that the leg portion Ml moves toward the side of the acceleration pedal 4 (toward the right side in the vehicle width direction) relative to the vehicle body.

As described above, according to the present embodiment, the guide face 92 is formed at the column cover 9 and the leg portion Ml is guided toward the side of the acceleration pedal 4 when the automotive vehicle V collides against the obstacle α in the vehicle head-on collision, so that the state (press-operation state) of the hoot Mf placed on the acceleration pedal 4 (the press-face board 43) can be held. Accordingly, according to the present embodiment, the leg portion Ml located on the side of the acceleration pedal 4, the foot Mf of which tends to slip off the pedal in the head-on collision of the vehicle V, can be restrained by the guide face 92 from moving relatively, in the vehicle width direction, off the acceleration pedal 4, so that the foot Mf can be properly restrained from moving, in the vehicle width direction, off the acceleration pedal 4.

Further, the acceleration pedal 4 of the present embodiment is, as described above, comprised of the so-called organ type of pedal which has its swinging center positioned below the press face and slants forward through the press operation of the press face. In the case of the present embodiment, the leg portion Ml located on the side of the organ type of pedal (acceleration pedal 4), the foot Mf of which tends to slip off the pedal in the head-on collision of the vehicle V, can be restrained by the guide face 92 from moving relatively, in the vehicle width direction, off the organ type of pedal (acceleration pedal 4), so that the foot Mf can be properly restrained from moving, in the vehicle width direction, off the organ type of pedal (acceleration pedal 4).

Meanwhile, when the passenger M seated in the driver's seat 1 egresses from the vehicle, the appropriate ingress-and-egress performance of the passenger is influenced by the distance between the passenger's knee Mk and the column cover because the knee Mk of the passenger M is positioned near the column cover 9. Herein, when considering a manner of egress of the passenger M seated in the passenger's seat 1 (hereinafter, referred to as "vehicle-egress mode"), there may be two vehicle-egress modes in general, that is—a first vehicle-egress mode in which the passenger M egresses with the foot Ml placed on the brake pedal 5, and a second vehicle-egress mode in which the passenger M egresses with the foot Ml drawn off the brake pedal 5.

In the first vehicle-egress mode, since the leg portion Ml is kept to be stretched out forward similarly to the case in which the foot Mf is placed on the acceleration pedal 4, the knee Mk is located at a low level similarly to the case illustrated by a solid line in FIG. 1. Accordingly, any interference of the keen Mk with the column cover 9 may not occur in the first vehicle-egress mode.

Meanwhile, in the second vehicle-egress mode, in a case in which the passenger M is tall (higher than 175 cm, for example), as illustrated by a one-dotted broken line in FIG. 1, the foot Mf is drawn back so that the knee Mk is located at a higher level than that in the first vehicle-egress mode. Accordingly, interference of the knee Mk with the column cover 9 may occur easily in the second vehicle-egress mode.

Further, a third vehicle-egress mode, in which the passenger M who is seated with the hips Mh located forward slightly egresses keeping this position, may be considered as another vehicle-egress mode as shown with a two-dotted broken line in FIG. 1.

In this third vehicle-egress mode, the knee Mk is located at a higher level than that in the first vehicle-egress mode because the hips Mh is located forward slightly even if the passenger M is not tall, so that the knee Mk may interfere with the column cover 9 easily, like the second vehicle-egress mode.

Accordingly, the guide face 92 of the present embodiment, as described above, is configured to be positioned in front of the lower-face rear end portion 91a and project downward below the extension line L2. In other words, the lower-face rear end portion 91a of the column cover 9 is positioned at a higher level than the guide face 92 provided at a forward position. Thereby, even if the passenger M egresses from the vehicle in the second or third vehicle-egress modes in which the knee Mk is located at a relatively high level, any interference of the knee Mk with the column cover 9 can be avoided, so that the appropriate ingress-and-egress performance of the passenger can be ensured.

Herein, while the longitudinal-position adjusting mechanism 2 of the present embodiment is provided to slant obliquely forward and upward, the position of the hips Mh (hip point) can be lowered by the tall passenger M adjusting the seat cushion 1a at a rearward position, so that the knee Mk can be set a lower level as well. Accordingly, in a case in which the guide face 92 is provided at the column cover 9, it is preferable that the longitudinal-position adjusting mechanism 2 be provided to slant obliquely forward and upward as described above.

Further, since the upward extension portion 92b which extends obliquely upward and toward the right side from the specified position which is located in front of the rear end portion 9a and the lower-face rear end portion 91a is provided in the present embodiment, the leg portion Ml can be guided in an earlier stage at a position located rearward from the downward extension portion 92a projecting downward below the extension line L2. Thereby, it can be more smoothly restrained that the leg portion Ml moves relatively, in the vehicle width direction, off the acceleration pedal 4.

Moreover, since the guide face 92 is located at the more inside position of the column cover 9, compared to the side face 94 which is opposite to the side face 93 of the column cover 9 positioned on the side of the acceleration pedal 4 in the vehicle width direction, the scope of guiding the leg portion Ml located on the side of the acceleration pedal 4 in the vehicle width direction can be enlarged. Accordingly, even if the knee Mk of the passenger M moves in the vehicle width direction in the head-on collision of the vehicle, the leg portion Ml can be guided stably.

Further, since only the side face of the column cover 9 positioned on the side of the acceleration pedal 4 is located at the more inside position of the column cover 9, a space for storing some components, such as the above-described steering-angle sensor 24, can be provided inside the column cover 9 located on the opposite side to the acceleration-pedal-arrangement side (on the side of the side face 94).

Also, since the downward extension portion 92a is located at the more downward position, compared to the side face 94 opposite to the side face 93 of the column cover 9, the column cover 9 located on the opposite side (on the side of the side face 94) can be configured not to project downward. Accordingly, a moving space for the knee Mk in the passenger's ingress-and-egress can be provided, so that any interference of the knee Mk with the column cover 9 can be avoided surely.

Further, since tilt lever 25 is provided at the specified portion of the lower face 91 of the column cover 9 which is positioned on the opposite side to the acceleration-pedal-arrangement side in the vehicle width direction, it can be restrained that a space around the leg portion Ml when the passenger M is seated in the driver's seat 1 becomes improperly narrow because of an existence of the tilt lever 25.

Figure 8:
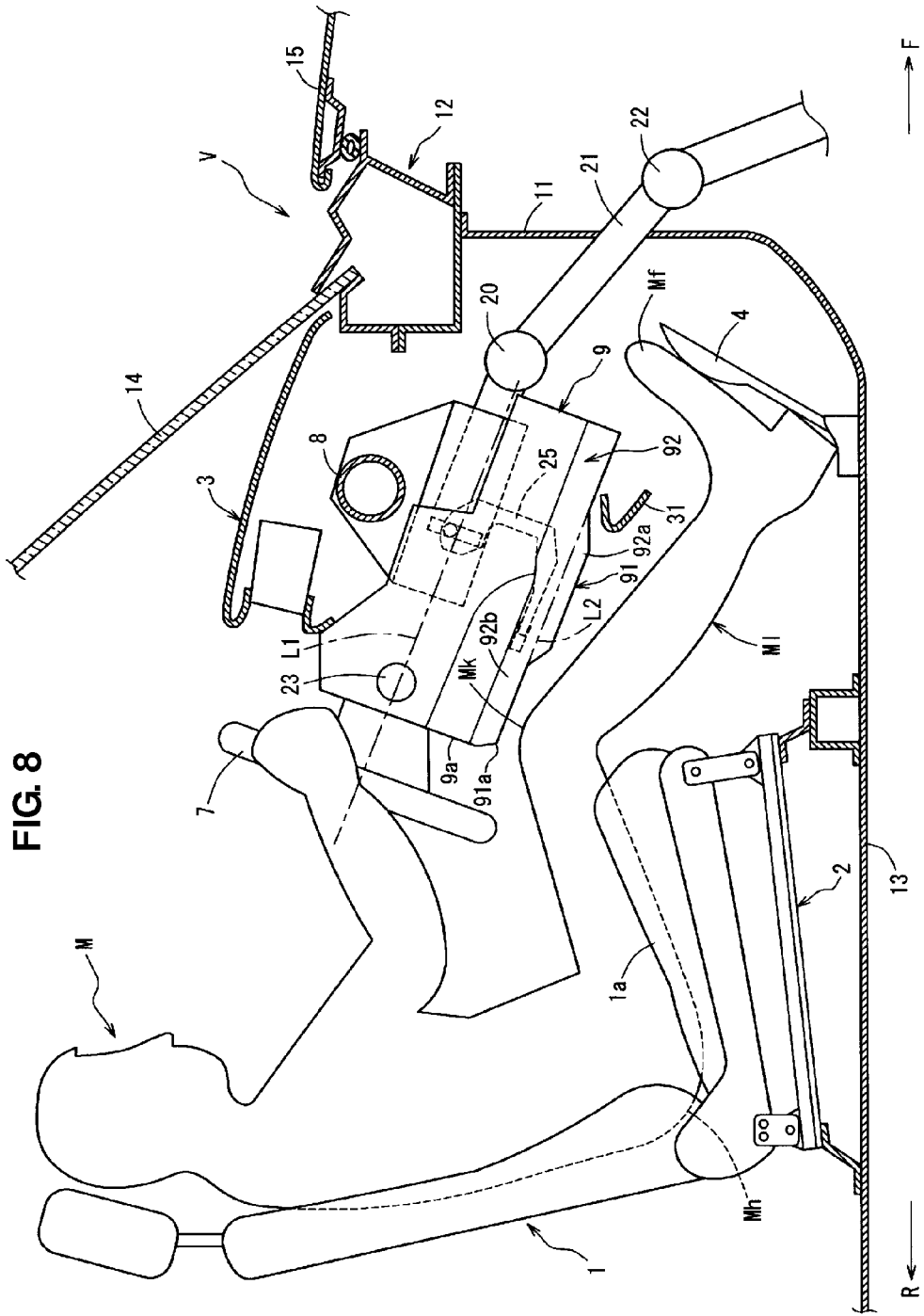
FIG. 8 is a side view showing a vehicle front portion equipped with a steering column cover structure according to another embodiment of the present invention.
Figure 9:
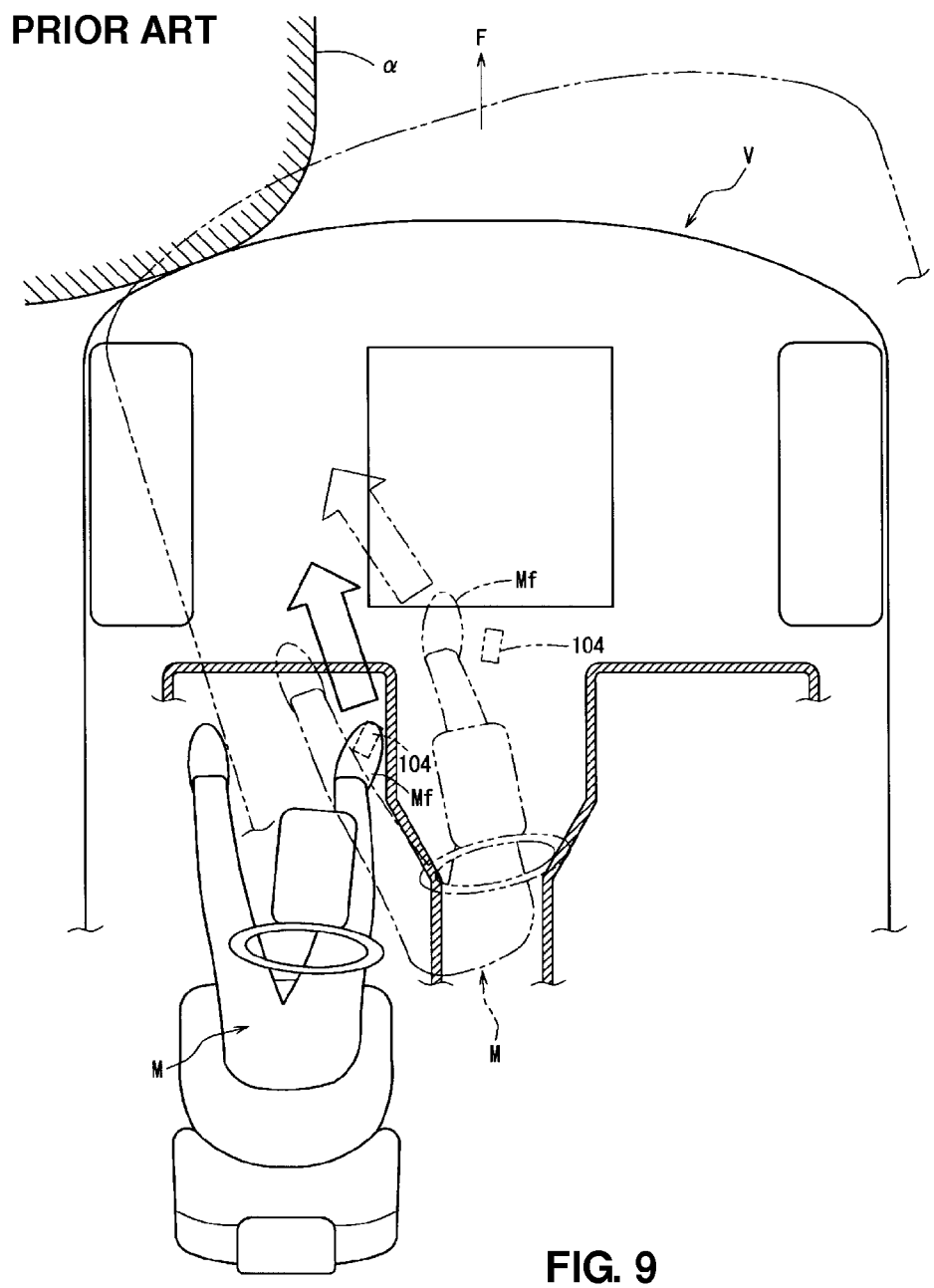
FIG. 9 is an explanatory diagram explaining a conventional problem in that a foot slips off a press face of a pedal in a vehicle head-on collision.

FIG. 8 is a side view showing a vehicle front portion equipped with a steering column cover structure according to another embodiment of the present invention. In some type of the automotive vehicle V, a lower panel 31 is provided to cover a lower portion of the column cover 9 like the instrument panel 3 shown in FIG. 8. In this case, a front end portion of the downward extension portion 92a of the guide face 92 may be located vehicle rearward as illustrated. Herein, in FIG. 8, the same reference structural elements as those of the above-described embodiments shown in FIGS. 1-7, are denoted by the same reference characters, descriptions of which are omitted.

While the passenger M moves obliquely forward relative to the vehicle body as described above in the head-on collision of the automotive vehicle V, the leg portion Ml may not actually move to the front end portion of the column cover 9 actually. Even if the leg portion Ml moved to the front end portion of the column cover 9, an impact of the leg portion Ml could be absorbed by the resin-made lower panel 31 in the case of FIG. 8. Accordingly, in a case in which the lower panel 31 is provided at the instrument panel 3, the front end portion of the downward extension portion 92a can be located vehicle rearward.

Further, while the above-described embodiments adopt the organ type of pedal as the acceleration pedal 4, the present invention is not limited to this. A hanging type of acceleration is applicable.

Moreover, the present invention is applicable to any other pedal than the acceleration pedal. Also, the present invention is not limited to the pedal of the above-described embodiments in which the swinging center (the lower-end hinge portion 42) is positioned below the press face. For example, a pedal which has its swinging center positioned at a level of a center of the press face, or a pedal which has its press face movable forward substantially horizontally through a press operation of its press face, as disclosed in Japanese Patent Publication No. 2007-257391, may be used.

The present invention is not limited to the above-described embodiments in which the amount of operation of the press-face board 43 is detected by the liner sensor. For example, another type in which the press-face board is coupled to a throttle valve of an engine via a wire so as to operate the throttle valve according to the operational amount of the press-face board, or a further another type in which an operational amount of a button which is positioned below the press-face board 43 is adjustable are applicable.

Further, while the above-described embodiments comprise the driver's seat 1, the column cover 9, and others which are arranged on the left side of the front portion in the vehicle compartment, the present invention is applicable to an automotive vehicle comprising a driver's seat, a column cover 9, and others which are arranged on the right side of the front portion in the vehicle compartment. Moreover, the present invention is applicable not only to a MT (manual transmission) vehicle equipped with the clutch pedal 6, but to an AT (automatic transmission) vehicle with no clutch pedal.

A steering-position adjusting lever of the present invention corresponds to the tilt lever 25 of the above-described embodiments. Likewise, the swinging center corresponds to the lower-end hinge portion 42. However, the present invention should not be limited to the above-described embodiments and modified examples, and any other further modifications or improvements may be applied within the scope of a sprit of the present invention.

What is claimed is:

1. A steering column cover structure of an automotive vehicle equipped with a pedal which is arranged on one side, in a vehicle width direction, of a steering column cover covering a steering column so as to move forward or slant forward through a press operation of a press face thereof,
wherein a guide face is provided at a specified portion of a lower face of the steering column cover which is positioned in front of a lower-face rear end portion in a steering-shaft axis direction and on a pedal-arrangement side, the guide face being configured to project downward below an extension line extending from the lower-face rear end portion of the steering column cover in the steering-shaft axis direction and extend forward.

2. The steering column cover structure of an automotive vehicle of claim 1, wherein said pedal is an acceleration pedal to operate a drive force of the vehicle.

3. The steering column cover structure of an automotive vehicle of claim 2, wherein said guide face is configured to extend obliquely upward and toward the pedal-arrangement side from a specified position which is located in front of a rear end portion of the steering column cover and the lower-face rear end portion of the steering column cover to a specified side portion of the steering column cover which is positioned on the pedal-arrangement side.

4. The steering column cover structure of an automotive vehicle of claim 3, wherein said guide face is located at a more inside position of the steering column cover, compared to a side face of the steering column cover which is opposite to another side face of the steering column cover positioned on the pedal-arrangement side in the vehicle width direction.

5. The steering column cover structure of an automotive vehicle of claim 2, wherein said guide face is located at a more downward position, compared to a side face of the steering column cover which is opposite to another side face of the steering column cover positioned on the pedal-arrangement side in the vehicle width direction.

6. The steering column cover structure of an automotive vehicle of claim 3, wherein a steering-position adjusting lever is provided at a specified portion of the lower face of the steering column cover which is positioned on an opposite side to the pedal-arrangement side in the vehicle width direction.

7. The steering column cover structure of an automotive vehicle of claim 2, wherein said acceleration pedal is a pedal having a swinging center which is positioned at or below a level of a center of the press face of the pedal.

8. The steering column cover structure of an automotive vehicle of claim 1, wherein said pedal is configured to move forward substantially horizontally or slant forward.

9. The steering column cover structure of an automotive vehicle of claim 8, wherein said guide face is configured to extend obliquely upward and toward the pedal-arrangement side from a specified position which is located in front of a rear end portion of the steering column cover and the lower-face rear end portion of the steering column cover to a specified side portion of the steering column cover which is positioned on the pedal-arrangement side.

10. The steering column cover structure of an automotive vehicle of claim 9, wherein said guide face is located at a more inside position of the steering column cover, compared to a side face of the steering column cover which is opposite to another side face of the steering column cover positioned on the pedal-arrangement side in the vehicle width direction.

11. The steering column cover structure of an automotive vehicle of claim 8, wherein said guide face is located at a more downward position, compared to a side face of the steering column cover which is opposite to another side face of the steering column cover positioned on the pedal-arrangement side in the vehicle width direction.

12. The steering column cover structure of an automotive vehicle of claim 9, wherein a steering-position adjusting lever is provided at a specified portion of the lower face of the steering column cover which is positioned on an opposite side to the pedal-arrangement side in the vehicle width direction.

13. A steering column cover structure of an automotive vehicle, comprising a guide face which is provided at a specified portion of a lower face of a steering column cover covering a steering column which is positioned in front of a lower-face rear end portion in a steering-shaft axis direction and on an acceleration-pedal-arrangement side,
wherein said guide face is configured to project downward below an extension line extending from the lower-face rear end portion of the steering column cover in the steering-shaft axis direction and extend forward, and to extend obliquely upward and toward the acceleration-pedal-arrangement side from a specified position which is located in front of a rear end portion of the steering column cover and the lower-face rear end portion of the steering column cover to a specified side portion of the steering column cover which is positioned on the acceleration-pedal-arrangement side,
said guide face is located at a more downward position, compared to a side face of the steering column cover which is opposite to another side face of the steering column cover positioned on the acceleration pedal-arrangement side in the vehicle width direction, and
a steering-position adjusting lever is provided at a specified portion of the lower face of the steering column cover which is positioned on an opposite side to the acceleration-pedal-arrangement side in the vehicle width direction.

14. A steering column cover structure of an automotive vehicle equipped with a pedal which is arranged on one side, in a vehicle width direction, of a steering column cover covering a steering column so as to move forward or slant forward through a press operation of a press face thereof,
wherein a guide face is provided at a specified portion of a lower face of the steering column cover which is positioned in front of a lower-face rear end portion in a steering-shaft axis direction and on a pedal-arrangement side, the guide face being configured to project downward below an extension line extending from the lower-face rear end portion of the steering column cover in the steering-shaft axis direction and extend forward, and to extend obliquely upward and toward the pedal-arrangement side from a specified position which is located in front of a rear end portion of the steering column cover and the lower-face rear end portion of the steering column cover to a specified side portion of the steering column cover which is positioned on the pedal-arrangement side,
said guide face is located at a more downward position, compared to a side face of the steering column cover which is opposite to another side face of the steering column cover positioned on the pedal-arrangement side in the vehicle width direction, and
a steering-position adjusting lever is provided at a specified portion of the lower face of the steering column cover which is positioned on an opposite side to the pedal-arrangement side in the vehicle width direction.

* * * * *